United States Patent [19]
Fukami

[11] 3,882,742
[45] May 13, 1975

[54] METHOD AND APPARATUS FOR BANDSAWING OPERATION WITH PROFILING MECHANISM CAPABLE OF AUTOMATIC COPYING OF A MODEL

[75] Inventor: Toshihiro Fukami, Toyohashi, Japan
[73] Assignee: Fukami Co., Ltd., Toyohashi, Japan
[22] Filed: June 6, 1973
[21] Appl. No.: 367,568

[30] Foreign Application Priority Data
June 15, 1972 Japan .............................. 47-059873

[52] U.S. Cl. .......................... 83/56; 83/62; 83/410; 83/811; 83/820
[51] Int. Cl. ............................................ B27b 13/10
[58] Field of Search ............ 83/410, 413, 820, 811, 83/809, 810, 565, 62, 56

[56] References Cited
UNITED STATES PATENTS
2,602,987  7/1952  Wells ...................................... 83/62
2,774,131  12/1956  Crane ............................... 83/820 X
2,843,917  7/1958  Crane et al. ....................... 83/820 X
3,733,952  5/1973  Fukugami ......................... 83/565 X

Primary Examiner—J. M. Meister
Attorney, Agent, or Firm—Woodham, Blanchard and Flynn

[57] ABSTRACT

A method of bandsawing operations for performing curvilinear cutting on the work material, while automatically copying a model, without any specific proficiency in the machine handling during the cutting operations. The profiling mechanism incorporated for use with this band sawing machine is of semi-mechanical and semi-electrical construction in combination with certain electric devices.

5 Claims, 8 Drawing Figures

METHOD AND APPARATUS FOR BANDSAWING OPERATION WITH PROFILING MECHANISM CAPABLE OF AUTOMATIC COPYING OF A MODEL

The present invention relates to a new and useful bandsawing operation using a uniquely constructed band sawing machine with profiling mechanism incorporated therein which is specifically capable of cutting the material in a curvilinear manner. More particularly, this invention is concerned with a method of cutting a work by using a band sawing machine with a profiling mechanism incorporated therein which is specifically designed to permit curvilinear cutting operations on the material without any difficulty by virtue of the profiling means in combination with the specific construction of the band sawing machine according to this invention.

This invention is basically intended for an ease of general cutting work of the band sawing machine, particularly of curvilinear cutting operations by the uniquely constructed band sawing machine with profiling means incorporated, which have long been required but deemed very difficult to be realized in consideration of the conventional construction of the band sawing machine per se as well as the configuration of the bandsaw blades. Such bandsaw blade has a body portion of a far wider breadth than that of the cutting edge portion thereof, normally by several times as wider. Therefore, usually it is considerably difficult, or rather practically impossible to turn the direction of cutting on the working material during such saw-cutting operations in an attempt to perform such curvilinear cutting work. If such curvilinear cutting operation is practiced by using the conventional band sawing machine plus such bandsaw blade of broad width, it would jeopardize such turning procedures for changing the direction of cutting correctly and accurately as desired due to the interference of the bandsaw blade with a work material or a work, and further if such attempts to change the direction of cutting should nevertheless the carried on forcibly against such interference of the blade, there would inevitably be an improper resistance on the bandsaw blade, which should result in occasional damages to the work or even breakages of the cutting edge portion of the blade.

In consideration of the abovementioned inconveniences and limitation in the cutting operations due to the conventional band sawing machine, it is not recommendable to forcibly perform such curvilinear cutting operations except for only a slightly curved cutting operation. In the conventional band sawing machine, however, it requires considerably awkward jobs, should such curvilinear cutting operations be tried therewith, such as initially operating a preliminary rectilinear cutting roughly tangential to the desired cutting line or contour, and subsequently repeating the cutting operations once or more for trimming purposes so as to finally obtain such cutting line and/or contour as is somehow close to the designed cutting line so predetermined.

In consideration of the above stated defects and inconveniences in the cutting operations using the conventional band sawing machine which have long been regarded inherent to the conventional design and construction of the bank sawing machine or the configuration of the bandsaw blade, it would be advantageous to provide a band sawing machine designed to perform general curvilinear cutting operations in the following manner and obviate the abovementioned defects and problems specific to the band sawing machine of the conventional design and construction.

It is therefore a primary object of the present invention to provide a band sawing machine which is of such specific design or construction that enables the sawing operational portion of the machine or the bandsaw blade per se to be deflectable precisely around the bandsaw blade cutting edge portion as the center of such deflecting action, thus permitting the bandsaw blade to be orientated to every point of cutting along the predetermined cutting line or contour on the material, thereby to permit a precise curvilinear cutting operation on the material fed into the cutting position of the band sawing machine, according to the predetermined direction wherever so required, while accurately copying a model and prevent any harmful and improper strains from occuring at the cutting edge portion of the bandsaw blade during the sawing operations.

It is another object of this invention to provide a band sawing machine with a profiling mechanism incorporated therein, which is capable of converting the amount of detection obtained at the profile sensing member thereof to the amount of the revolution in either forward or reversed direction of an electric motor, thereby driving a bandsaw blade deflection operating member so as to precisely and reliably cause a travelling of the bandsaw blade according to the curved configuration or profile of a work model, whereby it is possible to obtain a correct and accurate cutting configuration of the work material as desired.

It is a further object of this invention to provide a band sawing machine with a profiling mechanism incorporated therein, wherein there is provided a delivery member, which is adapted to deliver the work material or work into a cutting position toward the bandsaw blade, freely movably in a direction perpendicular to the direction of the material delivery so as to follow up with the configuration or profile of the work model, and such delivery motion may be performed by means of a pneumatic mechanism which is controllable by a profiling valve functioning upon the actuation of the abovementioned profile sensing member, whereby the work material to be cut may be caused to move in the abovementioned perpendicular direction by a predetermined amount of travelling irrespective of the cutting resistance to be encountered during the cutting operation, thus permitting a precise curvilinear cutting operation in a full conformity with the profile of the work model.

Essentially, according to the present invention, there is provided a method of cutting a work by using a band sawing machine with a profiling mechanism incorporated therein having a profile sensing member and a bandsaw blade deflection operating member adapted to function in response to the actuation of said profile sensing member, characterized in that it comprises the steps of converting the quantity of detection obtained by said profile sensing member into the quantity and the sense of rotation of a motor, driving said bandsaw blade deflection operating member according to said quantity and the sense of rotation of said motor, orientating said bandsaw blade to a required quantity of orientation in accordance with the given profile of a work model around the cutting edge portion of said bandsaw blade as the center of said orientation, and feeding back the orientating motion of said bandsaw blade to said profile sensing member.

The nature, principle, and details of the present invention, as well as further characteristics and advantages thereof, will become more apparent from the following detailed description with respect to a preferred embodiment of the invention when read in conjunction with the accompanying drawing, in which like parts or portions are designated by like reference numerals, and in which:

Referring to the accompanying drawings, which show for illustrative purpose only but not in any way for limitations one preferred embodiment of a band sawing machine according to the present invention, there is shown a machine base 1, in which there is provided a bandsaw driving wheel 3 driven by a prime mover such as an electric motor 2, and there is provided a driven wheel 5 on a bandsaw housing or arm 4 which is disposed on the machine base 1. There is a bandsaw blade 6 provided between the driving wheel 3 and the driven wheel 5.

Before going any further, it is intended to define certain terms for expressing the direction of action or movement in this specification as well as the appended claims, i.e., "longitudinal" or "longitudinally" is used to indicate a direction fore-and-aft in a plane perpendicular to the face of attached drawings, while "transversal" or "transversally" is used to depict a direction designated in a plane in parallel with the face of drawings, in other words, to and from right and left along the drawing face, and the work "vertical" or "vertically" is used to mean a movement or action in a plane in parallel to but from the upper side down to the lower side of the drawing face.

Figure 1:
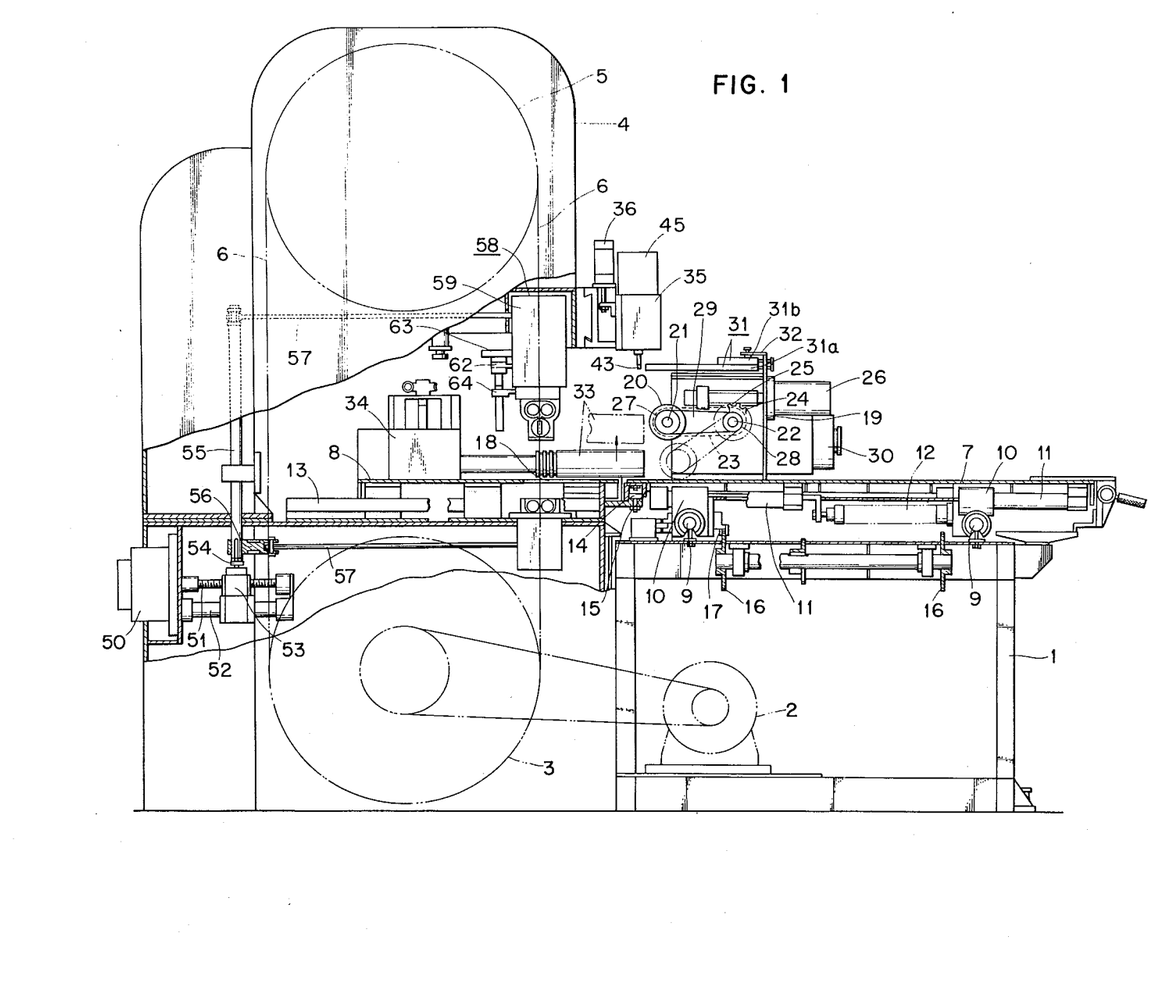
FIG. 1 is a side elevational view, in vertical cross-section, showing a band sawing machine according to the present invention.

Referring now to FIG. 1, on the upper surface of the machine base 1, there are a delivery table 7 provided movably both longitudinally and transversally and a jig table 8 which is on the other hand provided movably only transversally.

There are provided two rails 9,9 toward a direction perpendicular to the face of the drawing or longitudinally on the right portion of the machine base 1 as viewed in FIG. 1, and with respect to these rails 9,9 there are provided a pair of tracks 10,10 in slidable engagement therewith. Said tracks 10,10 are adapted to engage slidably with guide rods 11,11 provided under the delivery table 7 extending transversally as viewed in the same drawing figure.

Consequently, the delivery table 7 is capable of travelling in the longitudinal direction as viewed in the drawing figure by virtue of the relationship between the rails 9,9 and the tracks 10,10, as well as in the transversal direction, which is at a right angle to the abovementioned direction by virtue of the relationship between the tracks 10,10 and the guide rods 11,11. There is further provided an air cylinder 12 between the tracks 10 and the delivery table 7.

On the left portion of the machine base 1, there is provided a guide rod 13 in the transversal direction as viewed in FIG. 1, and along this guide rod 13 provided is the jig table 8 slidably in the transversal direction.

The delivery table 7 and the jig table 8 are arranged to be positioned on the same plane, and there are provided rollers 14 at the end portion of the jig table 8 toward the delivery table 7. Said rollers 14 are adapted to engage with a channel 15 extending longitudinally at the end portion of the delivery table 7.

There is provided a sprocket 16 throughout the longitudinal depth of the machine base 1, which is driven by a motor (not shown), and as the sprocket chain 17 in mesh with the sprocket 16 is operatively connected to the abovementioned tracks 10,10, the delivery table 7 is caused to move longitudinally along the depth of the machine base 1 owing to the driving force from the motor.

During the longitudinnal operation of the delivery table 7, the rollers 14 of the jig table 8 will rotate only idly within the channel 15 of the delivery table 7, and therefore, the jig table 8 will not be moved, while, as will be further described hereinafter, during the profiling operation of the delivery table 7, wherein the delivery table 7 is caused to move longitudinally while moving transversally, the jig table 8 is caused to move transversally according to the transversal movement of the delivery table 7, while permitting a longitudinal movement of the delivery table 7 through function of the rollers 14.

The jig table 8 is provided with a notched portion 18 which is adapted to position the bandsaw blade 6 therewithin during the whole stroke of travelling in the transversal direction.

On the upper surface of the delivery table 7, there is provided a feed roller 20 for the delivery of the material to be cut, which roller is mounted in the supporting frame 19 which is detachable with respect to the delivery table 7. That is to say, the shaft 21 of the feed roller 20 is stemmed from the end portion of the rotating arm 23 which is pivoted on the shaft 22, and by virtue of the structural relationship between a pinion 24 provided at the pivotal base of the rotating arm 23 and a rack 25 engaging with the pinion, the feed rooler 20 is caused to swingably move in the vertical direction by function of an air cylinder 26 which is connected to the rack 25. Moreover, there are provided sprockets 27,28 on the shafts 21,22, respectively, and there is a sprocket chain 29 slung between these sprockets 27,28. Therefore, the roller 20 is caused to rotate by the power transmission from the motor 30 in close proximity to the delivery table 7, thus delivering the material to be cut with respect to the jig table 8.

There is provided a fixing member 32 for a work model 31 in position above the upper surface of the supporting frame 19. Upon the jig table 8, there is a feed roller 33 provided movably in the vertical direction with respect to a supporting frame 34, which is adapted to grip the working material in a gap between the jig table 8 fed by the delivery table 7, so as to deliver toward the bandsaw blade 6 at right angles to the direction of such delivery.

A profile sensing member 35 is provided movably in the vertical direction at the mounting section inside the bandsaw housing or arm 4 and adapted to be moved in the vertical direction by function of the air cylinder 36.

Figure 2:
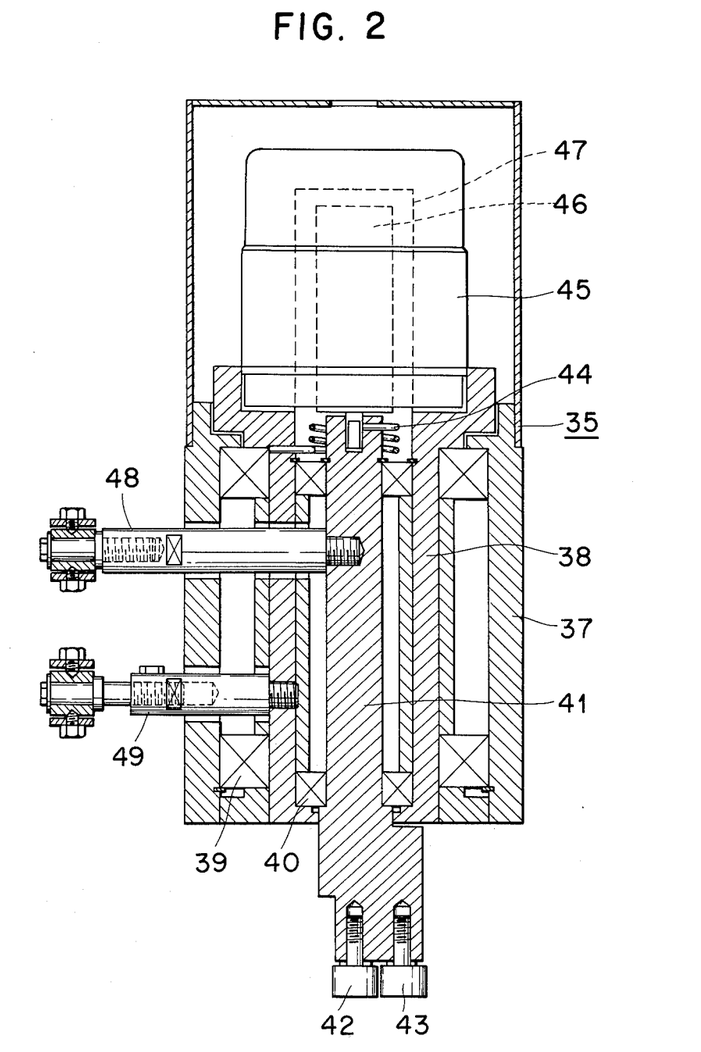
FIG. 2 is an enlarged vertical cross-sectional view, showing a profile sensing member of the machine.
Figure 3:
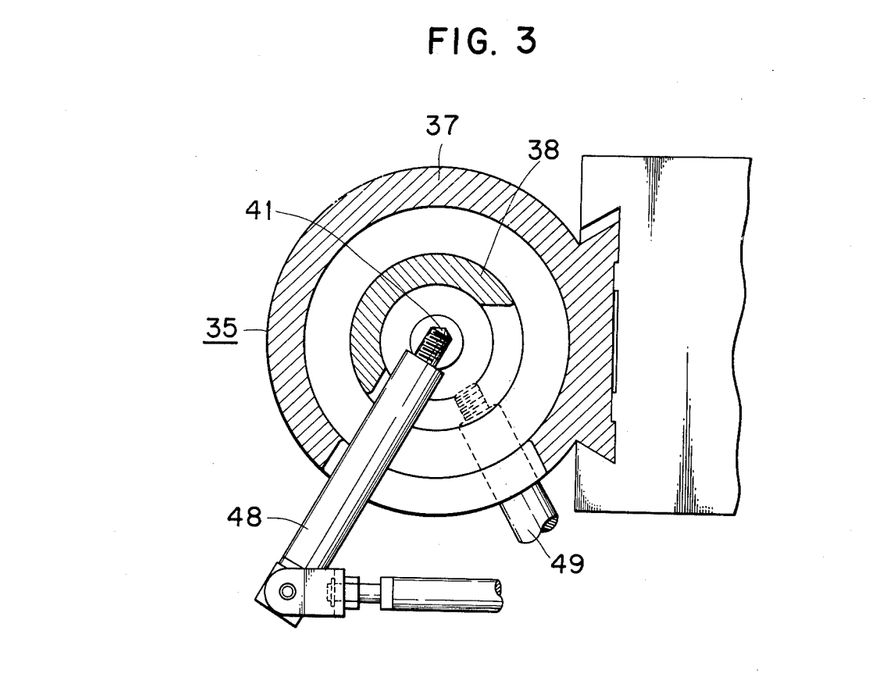
FIG. 3 is an enlarged transversal cross-sectional view, showing the profile sensing member of the machine.

In the profile sensing member 35, an inner cylinder 38 is provided rotatably through a bearing 39 inside of an outer cylinder 37, and further provided is a rotating shaft 41 through a bearing 40 at the central portion of the abovementioned inner cylinder 38.

At the central portion and the eccentric portion of the lower end of the rotating shaft 41 a fulcrum roller 42 and a sensing roller 43 are arranged rotatably, At the upper portion of the rotating shaft 41 there is mounted a coil spring 44, one end of which is carried by the rotating shaft 41, while the other end of which is hooked to the inner cylinder 38.

Furthermore, to the upper end of the rotating shaft 41 is connected a primary rotor 46 of a displacement detecting device 45, while a secondary stator 47 thereof is connected to the upper end of the abovementioned inner cylinder 38.

There are provided a connecting rod 48 for manually controlling the profiling operation and another connecting rod 49 for feedback operation which are connected to the rotating shaft 41 and the inner cylinder 38, respectively and disposed extending outwardly out of the notched section of the outer cylinder 37.

There are arranged profiling rollers 42,43 so as to followingly detect the contour or profile of the work model 31 in terms of an extent of rotary displacement of the rotating shaft 41, the quantity of which displacement is electrically converted to an output potential of the displacement detecting device, and this output potential is then applied to a print motor 50 through a device for controlling a d/c servo motor, thus resulting in a forward or reversed sense of the rotation of the abovementioned print motor 50.

Figure 5:
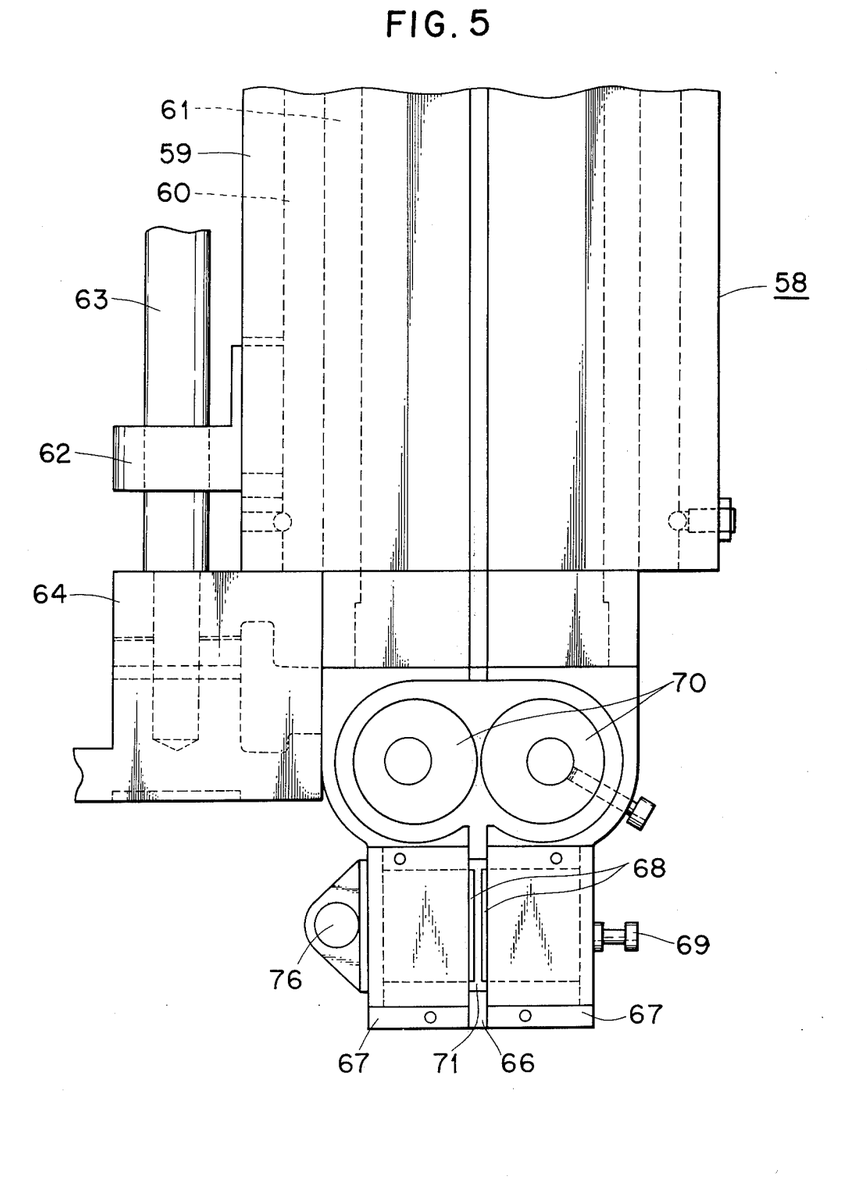
FIG. 5 is a front elevational view, showing the main elements of a bandsaw blade deflection operating member of the machine.
Figure 6:
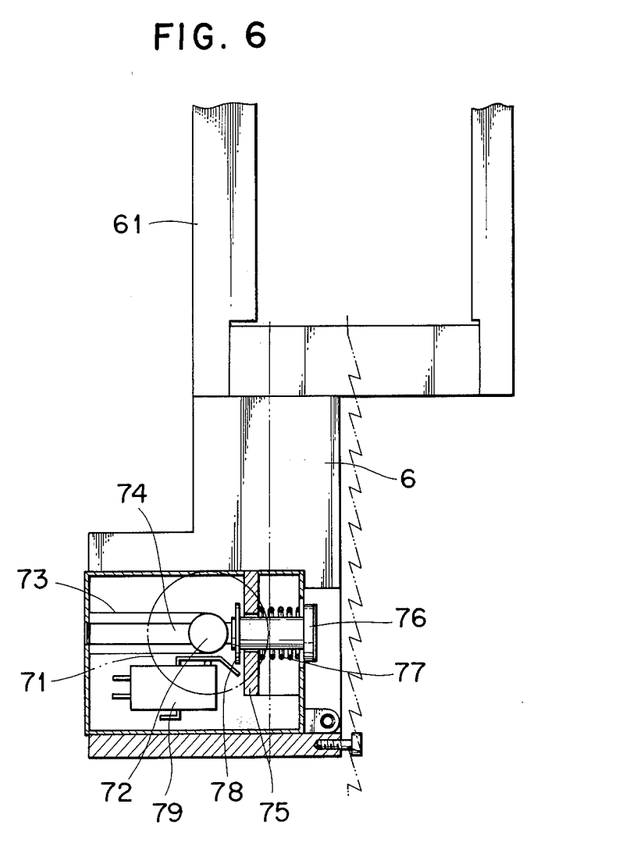
FIG. 6 is a side elevational view of FIG. 5, partly in section.

The resultant rotation of the print motor 50 rotates a threaded rod 51 which is interconnected to the print motor, thus by function of a guide rod 52 this rotating motion being convered to the linear motion of a travelling member 53 which is threadedly engaged with the rod 51. This linear motion is then converted through an arm 54 to the rotating motion of a vertical rod 55, and further converted through an arm 56 to the transversal motion of upper and lower horizontal interconnecting rods 57,57, thus finally actuating deflection operating members 58 of the band sawing machine.

This deflection operating member 58 of the band sawing machine is adapted to forcibly deflect the bandsaw blade which is running through the notched portion 18 in the jig table 8, and provided both on the bandsaw housing or arm 4 and the machine base 1 as arranged corresponding to the abovementioned upper and lower horizontal interconnecting rods 57,57, respectively.

The following descriptions are given on one of the bandsaw deflection operating members 58 which is installed on the bandsaw housing or arm 4, since the other member 58 mounted on the machine base 1 is entirely identical in structure and function. A rotating cylinder 60 is rotatably carried within a stationary cylinder 59, and sliding cylinder 61 is adapted to vertically slide within the abovementioned rotating cylinder 60.

Illustratively stated, the threaded rod portion of an adjusting handle 63 installed on the arm 62 of the rotating cylinder 60 is threadedly engaged with an arm 64 of the sliding cylinder 61, so that the sliding cylinder 61 is selectively orientated in a vertical position by rotating operation of the adjusting handle 63.

A connecting rod 65 (FIG. 4) is connnected to the rotating cylinder 60 and protrudes outwardly out of the notched portion of the stationary cylinder 59. The abovementioned horizontal interconnecting rod 57 is connected to the outmost end of the connecting rod 65, so that either of the rotating cylinder 60 or the sliding cylinder 61 will be caused to rotate or slide with respect to the stationary cylinder 59 through the connected rod 65 which is subjected to the transversal motion of the abovementioned horizontal interconnecting rod 57.

At the lower end of the sliding cylinder 61, the front side portion thereof is partially recessed, while at the rear side portion thereof provided are bandsaw blade guide seats 67,67 on the opposite sides thereof through a goove 66. Bandsaw blade guides 68 are fitted to the abovementioned seats 67,67 respectively, by means of a bolt 69. Above these bandsaw blade guide seats 67, there are provided guide roller 70 corresponding to the abovementioned bandsaw blade guides 68.

At the rear portion of the bandsaw blade guide seats 67, there is provided a backing roller 71 for the bandsaw blade. A shaft 72 of the backing roller 71 is adapted to move back-and-forth reciprocatively with respect to a groove 73 on the cylinder body 61. With one end of said shaft 72 an adjusting threaded rod 74 is engaged threadedly. Said threaded rod 74 extends forwardly through a supporting portion 75 thereof and a compression spring 77 is provided between a head portion 76 of the abovementioned rod 74 and the supporting portion 75. Therefore, the roller 71 is biased forwardly, and by rotating the threaded rod 74, the compressive degree of the compression spring 77 may be duly adjusted, so that the resisting force of the backing roller 71 against the bandsaw blade can be adjusted to a desired level.

To the adjusting threaed rod 74, there are additionally provided a contact board 78 at the rear portion of the supporting portion 75 and a limit switch 79 within the travelling range of the contact board 78. Accordingly, when there occurs an overload on the bandsaw blade during cutting operations, the adjusting rod 74 will be caused to retract together with the roller 71 against the force of the spring 77 and the limit switch 79 is then caused to function by the contact board 78 so as to stop the operation of the sawing machine, thus preventing the possible breakage of the bandsaw blade due to an improper operation of the machine.

During the normal operation of the band sawing machine wherein the bandsaw blade is supported by the backing roller 71, the cutting edge portion of the bandsaw blade is duly located in the center of the rotating motion of either the rotating cylinder 60 or the sliding cylinder 61, while the band sawing machine is operated for a tangentially deflecting operation for a curvilinear cutting procedures, the bandsaw blade 6 is caused to rotate with the cutting edge portion thereof as the center of rotating motion thereof.

Figure 4:
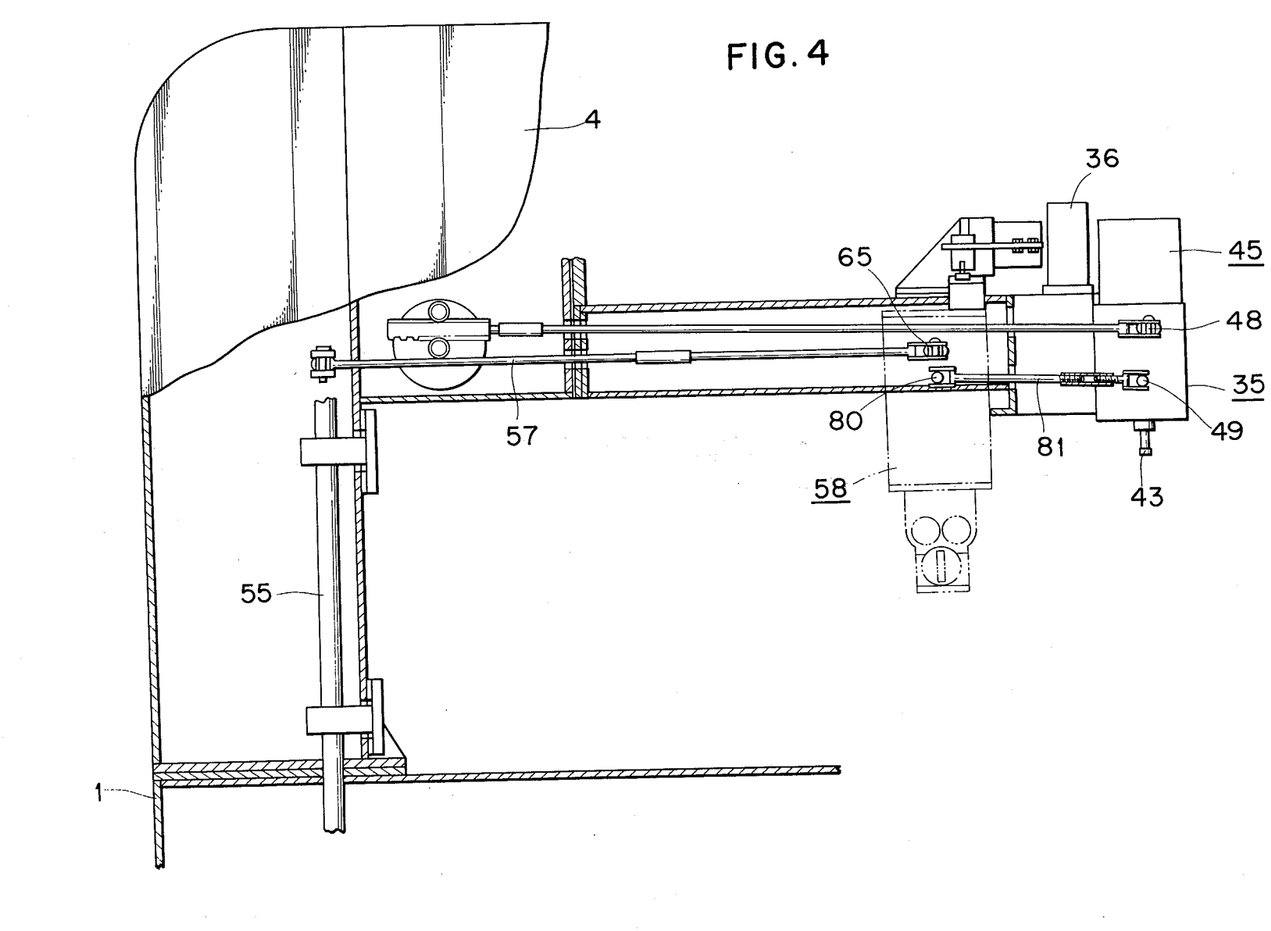
FIG. 4 is an enlarged view of an interlocking lever portion of the machine.

A connecting rod 80 is connected to the rotating cylinder 60 and extends outwardly from the notched portion of the stationary cylinder 59. Said connecting rod 80 is further connected through an interlocking rod 81 to the connecting arm 49 for the feedback operation to the inner cylinder 38 of the profile sensing member 35.

Figure 7:
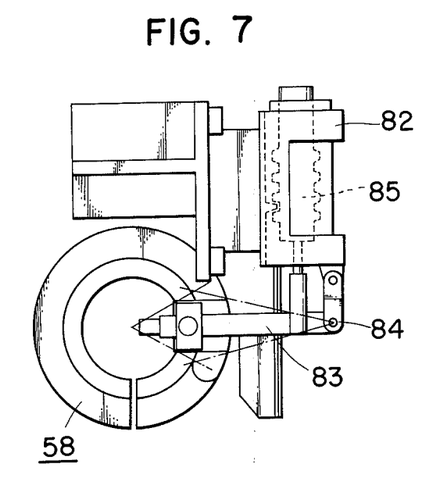
FIG. 7 is a plan view showing a profiling valve portion of the machine.
Figure 8:
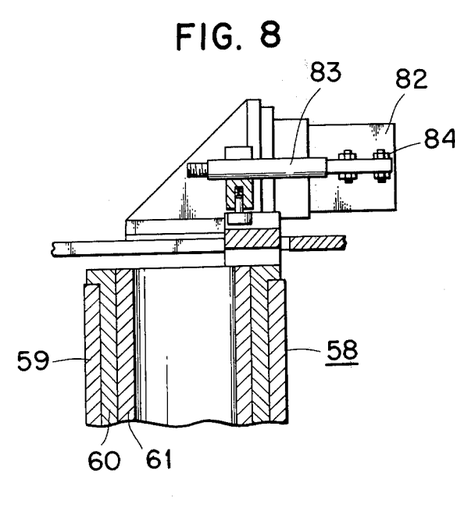
FIG. 8 is a vertical cross-sectional view of the above profiling valve portion.

In addition, above the rotating cylinder 60 there is provided a driving lever 83 for a profiling valve 82, which driving lever 83 is adapted to shift the pneumatic circuit by causing a piston 85 to be moved around a pivotal point 84 as a center of such rotating motion according to the transversally reciprocating motion of the rotating cylinder 60.

The profiling valve 82 is adapted to shift the pneumatic circuit for operating the abovementioned air cylinder 12 in transversal reciprocating motion in relation to the delivery table 7.

In the above described construction of the band sawing machine, work models 31a, 31b of desired configuration or profile are fixed to the delivery table 7 by means of a fixing member 32 in such a manner that the profiling surfaces of such models may face the rollers 42,43.

When delivering the work material to be worked onto the delivery table 7, there occurs a lowering motion of the feed roller 20 by the action of the air cylinder 26 which is actuated by a limit switch, and at the same time there takes place a delivery motion of the work material toward the table 8 by function of the motor 30. When the work material comes to a predetermined position on the jig table 8, the delivery motion is stopped by the action of another limit switch and the feed roller 33 is lowered in synchronism with this stopping of the delivery motion, thus delivering the working material toward the cutting position of the bandsaw blade 6 on the jig table 8. In this instance, the delivery table 7 will move in the direction of the feed of the work material in accordance with the feed speed of the feed roller 33.

During the cutting feed of the material, the work model 31 is caused to abut upon the rollers 42, 43 of the profile sensing member 35, and upon this abutting the displacement of the sensing roller 43 is detected in terms of a voltage by the displacement detecting device 45, thereby to rotate the print motor 50 in the forward or reversed direction in accordance with the orientation and quantity of displacement of the sensing roller 43 so as to be transmitted to the bandsaw blade deflection operating device 58. The bandsaw blade 6 is then deflected so that the cutting edge portion may be orientated accurately toward the desired cutting direction. Concurrently with this bandsaw deflecting operation, the pneumatic circuit is shifted by function of the profiling valve 82, whereby either of the delivery table 7 or the jig table 8 is caused to be driven toward a direction at a right angle to the direction of delivery toward the bandsaw blade as the work model 31 is caused to travel forwardly or rearwardly from the rollers 42,43 of the profile sensing device 35 by function of the air cylinder 12 in accordance with the contours or profiles of the model 31, thus providing the working material with a due travel in accordance with the contours or profiles of the model 31 so as to obtain an accurate profiling cutting operation as desired.

When the cutting operation is completed on the work material, the limit switch is operated to cause the delivery table 7 or the jig table 8 to travel toward the right hand side away from the bandsaw blade as viewed in FIG. 1, then quickly returning such a table linearly toward the original position thereof.

The profiling sensing device 35 is adapted to move in a vertical direction by the action of the air cylinder 36. With respect to the work models 31a and 31b located on upon another on the fixing member 32, the sensing device 35 causes the rollers 42,43 to abut upon the lower model 31a of larger dimensions in the initial stroke thereof, and subsequently causes the rollers to abut upon the upper model 31b of smaller dimensions in the following stroke, thus permitting a desired curvilinear cutting operation on the both sides of the work material.

By virtue of the automatic profiling curvilinear cutting capability of the present invention as fully described above, the necessity of awkward and wearsome manual adjustments as encountered even in bandsawing operations along a slightly curved line when using the band sawing machine of the conventional design and construction will be entirely eliminated by the application of the unique and convenient band sawing machine according to this particular invention. Owing to the specific and advantageous construction as described hereinbefore, it is now possible not only to perform precise curvilinear cutting operations on the work material, but also obtain a cut surface of beautiful finish, which has long been deemed practically impossible by the application of the band sawing machine of the conventional design and construction, thus contributing immensely to the achievement of such advantageous performance of curvilinear cutting operations of the character as hereinbefore described fully so effectively and reliably.

I claim:

1. A method of cutting a work by using a band sawing machine with a profiling mechanism incorporated therein and having a movable profile sensing member disposed in engagement with a work model having the desired profile on the outer periphery thereof, and a bandsaw blade deflection operating member adapted to function in response to the actuation of said profile sensing member, characterized in that it comprises the steps of converting the movement of said profile sensing member into an electrical signal which is a function of the quantity and the sense of movement of the profile sensing member, supplying said electrical signal to an electrical motor for causing a quantity and a sense of rotation thereof which is in relationship to said electrical signal, driving said bandsaw blade deflection operating member according to said quantity and the sensing of rotation of said motor, orienting said bandsaw blade to a required quantity of orientation by said blade deflection operating member in accordance with the given profile of the work model around the cutting edge portion of said bandsaw blade as the center of said orientation, and feeding back the orientating motion of said bandsaw blade to said profile sensing member.

2. A method of cutting as claimed in claim 1, further comprising a step of moving by a pneumatic force a delivery member for a work mounted thereon at right angles to the direction of delivery of said work toward said bandsaw blade in accordance with the quantity of movement of said profile sensing member, said pneumatic force being provided by means of a pneumatic cylinder under the control of a profiling valve with respect to the function of said profile sensing member.

3. A method of cutting as claimed in claim 1 wherein said quantity of movements is determined by the quantity of displacement of a profile sensing roller with respect to a fulcrum roller which constitutes said profile sensing member.

4. A method of cutting as claimed in claim 2 which further comprises a step of moving transversely a jig table in accordance with the transversal motion of a delivery table which is permitted to move transversally concurrently with said motion of said jig table.

5. A method of cutting as claimed in claim 1 which further comprises a step of adjusting the resisting force of backing roller for said bandsaw blade against said bandsaw blade running in contact with said backing roller, and a step of stopping the cutting operation of the band sawing machine by means of a limit switch which is adapted to function in response to an overload encountered during said cutting operation.

* * * * *